United States Patent
Chai et al.

(10) Patent No.: US 7,526,514 B2
(45) Date of Patent: Apr. 28, 2009

(54) SYSTEMS AND METHODS FOR DYNAMIC DATA BACKUP

(75) Inventors: Mu Chai, Bellevue, WA (US); Aditya Kapoor, Bellevue, WA (US); Wenlu Ma, Sammamish, WA (US); Craig Duncan, Issaquah, WA (US)

(73) Assignee: EMC Corporation, Hopkinton, MA (US)

( * ) Notice: Subject to any disclaimer, the term of this patent is extended or adjusted under 35 U.S.C. 154(b) by 386 days.

(21) Appl. No.: 11/080,229

(22) Filed: Mar. 15, 2005

(65) Prior Publication Data

US 2006/0149797 A1 Jul. 6, 2006

Related U.S. Application Data

(60) Provisional application No. 60/640,799, filed on Dec. 30, 2004.

(51) Int. Cl.
*G06F 17/30* (2006.01)
(52) U.S. Cl. .................. 707/204; 707/200; 707/201
(58) Field of Classification Search ................ 707/200, 707/203, 204, 201; 714/6, 4, 11, 12, 15
See application file for complete search history.

(56) References Cited

U.S. PATENT DOCUMENTS

| 5,530,939 | A | * | 6/1996 | Mansfield et al. ........... 707/201 |
| 5,671,350 | A | * | 9/1997 | Wood .......................... 714/15 |
| 6,035,412 | A | * | 3/2000 | Tamer et al. .................. 714/6 |
| 6,694,447 | B1 | * | 2/2004 | Leach et al. .................. 714/6 |

* cited by examiner

*Primary Examiner*—Cam-Linh Nguyen
(74) *Attorney, Agent, or Firm*—Workman Nydegger (57) ABSTRACT

In a computer network that includes database mirroring, a first database is located on a first database server and a second database is located on a second database server and, optionally, a witness database server. One of the first database or the second database is a live database while the other database is the mirror database. A process is initiated for communicating with the first database server, the second database server, or the witness database server, to determine which of the first database or the second database is the live database. The location of the live database is determined by reading information from the table entries in system databases on either the first or second database servers, or the optional witness database server, and a backup operation is performed wherein the live database is backed up.

26 Claims, 5 Drawing Sheets

SYSTEMS AND METHODS FOR DYNAMIC DATA BACKUP

CROSS REFERENCE TO RELATED APPLICATIONS

This application claims priority to U.S. Provisional Patent Application Ser. No. 60/640,799 filed Dec. 30, 2004, which is hereby incorporated by reference in its entirety.

BACKGROUND OF THE INVENTION

1. The Field of the Invention

The present invention relates to systems and methods for backing up data. More particularly, embodiments of the invention relate to systems and methods for backing up data in a database mirroring environment.

2. Related Technology

Computer networks are ubiquitous in both residential and commercial environments. In addition to widespread Internet use, local area networks (LANs) allow users to share computer services. Many corporate entities use LANs within their organizations and provide consumers with access to data over the Internet.

Dependence on computers and computer networks has created a need for improved availability and reliability of data. Many commercial entities store nearly all business data on a computer network, and network users expect uninterrupted access to the data at any given time. Software and hardware with enhanced capabilities are needed to support this demand for uninterrupted access to data. As the amount of data stored on a network, and the demand for accessibility to data on the network, grows, it becomes increasingly difficult to protect data from unforeseen events such as system failures, file corruption and viruses.

Protecting data from potentially devastating events is typically accomplished through a combination of software to back up the data, and secure hardware to store the backed-up data. As the amount of data to be preserved increases, the process of backing up the data becomes more complex. For example, gigabytes of data cannot be quickly transferred from a primary location to a backup location. In addition, making the data unavailable while the backup is performed is not a feasible option for environments where continual access to data is imperative.

Although backing up large amounts of data is problematic, it is not the only problem related to typical data backup systems. Network users and administrators may wish to back up various kinds of data. In addition to backing up files, network users may also wish to back up applications and services. Backing up applications and services can be challenging. For example, applications and services often have open files when the backup is initiated but because open files cannot generally be effectively or reliably backed up, such files are often skipped during backup operations. As a result, additional backup applications are often needed to help manage backup operations for applications and services whose files were skipped during the initial file system backup.

Another problem related to backing up data concerns the manner in which the backed-up data will be tracked when the data is moved to a backup location. In particular, when data is backed up, the backup copy is moved to a new location, thus making it necessary to have a record of how the data has been stored in order to facilitate access to the stored data. Typically, backup systems include a database that records the exact location of each file or application that is backed up. When a user wishes to locate or retrieve a file from the backup system, the database locates the file at the stored location of the file in the backup media.

While tracking the location of the backed-up data, typical backup software systems simply place the data in a backup location and track the location in an index. More intelligent database software systems have the ability to sort the data as it is backed up, so that the data is stored intelligently. For example, a more sophisticated database software system can store backups of like files on the same media. Sorting and storing data in this manner allows for more efficient data storage and retrieval.

Another shortcoming of typical backup software systems is their inability to allow for relocation of the data within a network, or to have more than one copy of the data available within the network Although the backup software system collects data from all users on the network, the data itself is viewed as residing at one single location on the network and is not cross referenced to other locations. While the data on the network is backed up, this redundancy and cross referencing are not addressed.

BRIEF DESCRIPTION OF THE DRAWINGS

To further clarify the above and other aspects of exemplary embodiments of the present invention, a more particular description of the invention will be rendered by reference to specific exemplary embodiments thereof which are illustrated in the appended drawings. It is appreciated that these drawings depict only exemplary embodiments of the invention and are therefore not to be considered limiting of its scope. The drawings are not drawn to scale. The invention will be described and explained with additional specificity and detail through the use of the accompanying drawings in which.

DETAILED DESCRIPTION OF EXEMPLARY EMBODIMENTS OF THE INVENTION

I. An Exemplary Database Operations System

Figure 1:
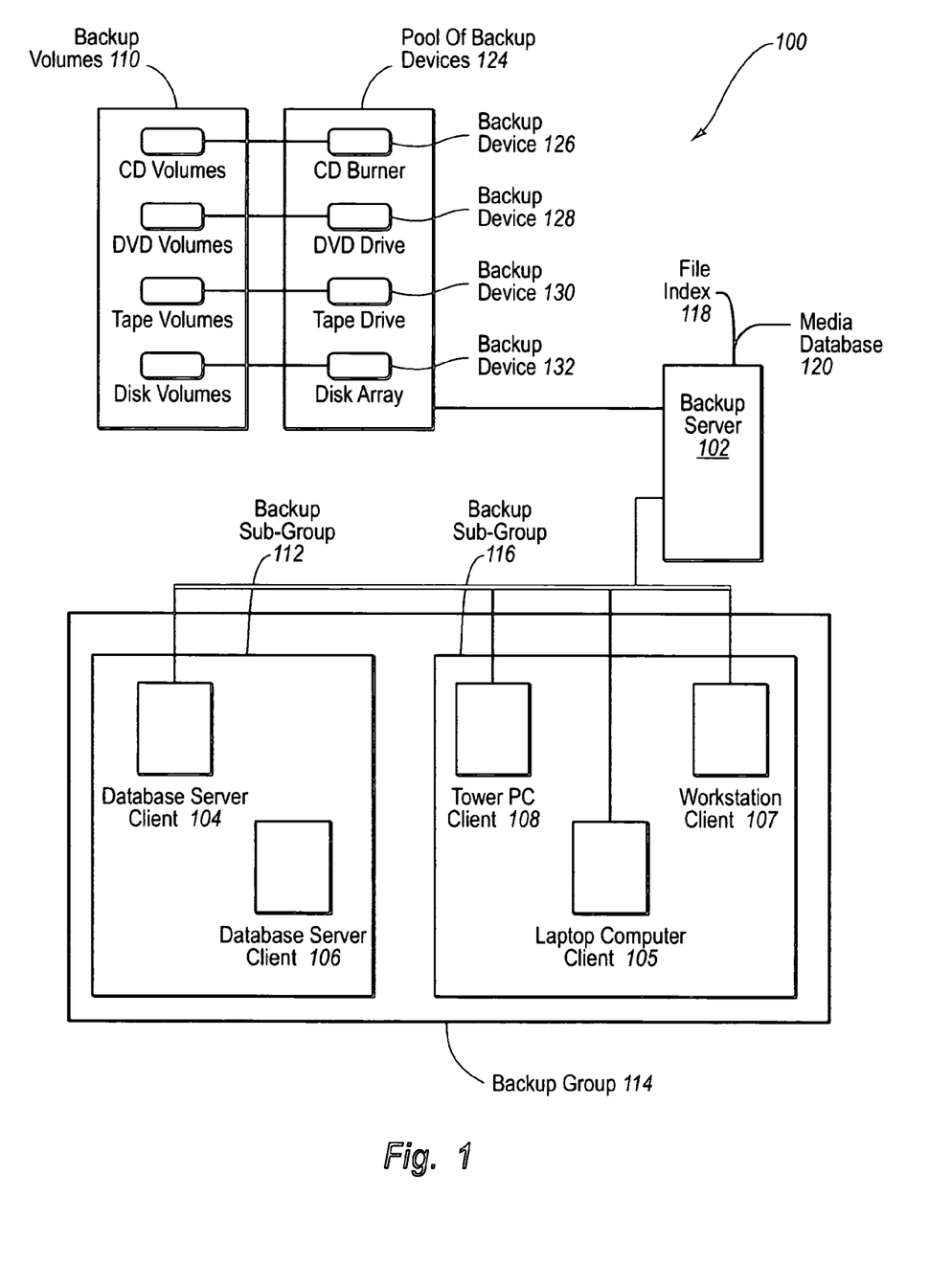
FIG. 1 illustrates an exemplary system for backing up file system data within a network.

One operational environment suitable for embodiments of the present invention is shown in FIG. 1. FIG. 1 illustrates an exemplary file system data backup and recovery system ("DBRS") 100 which generally functions to reproduce online file system data at a storage location and maintains location and obsolescence tracking information about the data. If the online version of the data is lost or corrupted, the DBRS 100 can recreate the data. In the event that the network in which the DBRS 100 operates experiences a disaster, DBRS 100 can recreate all DBRS 100 file systems to their original respective structures, as the file systems existed when written to storage.

An exemplary embodiment of DBRS 100 includes three basic components: a backup server 102, one or more clients 104, 105, 106, 107 and 108, and a backup volumes 110 of data. Backup server 102 and clients 104, 105, 106, 107, and 108 are the entities which have the software necessary to run the DBRS 100 operations. Backup server 102 includes the programs and services that organize and manage the DBRS 100 functions. Clients 104, 105, 106, 107, and 108 include the programs and services that execute the DBRS 100 functions.

Backup server 102 manages data for its set of clients, such as client 104, 105, 106, 107 and 108, for example. The clients 104, 105, 106, 107, and 108 represent machines on the network which deliver files to be backed up. Backup server 102 may incorporate the use of respective backup groups 112, 114, and 116 to organize the clients/data. Backup groups refer to sets of clients and/or data that are backed up together as a group. A single client can be included in multiple backup groups, as shown with backup group 112 and backup group 114.

To manage the data that is backed up from clients 104, 105, 106, 107, and 108, DBRS 100 relies on data tracking information, represented in FIG. 1 by the file index 118 and the media database 120 of backup server 102. The entries in file index 118 and media database 120 maintain content and location information describing all the data, both client machines and files, that has been backed up in the DBRS 100 environment.

File index 118 of backup server 102 is a browseable list of backed-up files organized according to each client. Each file on each client in the network that is backed up is listed in the file index. An entry in the file index 118 includes information about the file such as the file type, the time at which the file was backed up, and other information relating to the file, such as the client machine hosting the original file. Because a file may be backed up multiple times and the backup copies may be stored in multiple locations, an entry for a file in file index 118 may contain information concerning the backup location and time of backup for each backup of the file. The information in the file index 118 concerning multiple backup locations and backup times for a particular file enables a user to identify a specific version of the file for retrieval. Entry information concerning multiple backups of a file can remain in the file index 118 for any amount of time determined by an administrator.

While file index 118 tracks individual files, media database 120 tracks the location at which the files are stored. In other words, the media database 120 contains references to media storage locations. In operation, the media database 120 receives an entry each time a backup group 112, 114, or 116 is backed up to a storage volume on the DBRS 100. Just as with entries in the file index 118, entries will remain in the media database 120 until an administrator removes the entry. Entries in the media database 120 can also be removed if the corresponding data is overwritten.

Once the location information concerning the data is known, the data can be stored in different ways. For example, the data can be stored in media volumes on devices such as tape drives, hard disks, or removable disks accessible from the backup server 102, as shown in FIG. 1, or accessible by way of a remote server. In an exemplary system for backing up data, data is stored in volumes on devices, as exemplified by backup volumes 110 and backup devices 126, 128, 130 and 132. An example of storing data by device and volume is storing data on a disk array, with the data storage sub-grouped into disks. Another example of storing data by device and volume is storing data on a tape drive, with the data storage sub-grouped into specific tape volumes. A final example of storing data by device and volume is storing data on a remote server with the data storage sub-grouped into hard disks on the server. Although these examples are helpful in understanding possible configurations of devices and volumes, the ability of DBRS 100 to store data in devices and volumes is not limited to the examples given. In the most general sense, backup devices 126, 128, 130 and 132 refer to a conceptual model of ways for storing data that are not limited to specific systems or devices.

The usefulness of backup devices 126, 128, 130 and 132 within DBRS 100 is further enhanced by the ability of backup devices 126, 128, 130 and 132 to store data of various types. Specifically, backup devices 126, 128, 130 and 132 can contain data of every file type. For example, backup copies of image files, program execution files, and document files can be stored together in backup devices 126, 128, 130 and 132.

One underlying aspect of backup devices 126, 128, 130 and 132 is the ability of backup devices 126, 128, 130 and 132 to speed retrieval of backed-up files in DBRS 100. For example, when a user requests a restore of a backed-up file, the DBRS 100 can quickly retrieve the file if the file index and media database entries for the file contain highly specific location information including reference to backup devices 126, 128, 130 and 132, and the particular media that was used, such as, for example, the tape, CD, DVD, or other media that was used to store the file.

With regard to many features including backing up to backup devices 126, 128, 130 and 132, DBRS 100 is initially configured to execute functions independently. However, an administrator has many capabilities to control the DBRS 100 functionality. Thus, an administrator can segregate files for storage according to different client and/or file characteristics and can define when a backup volume has become obsolete and should be removed. For example, an administrator could configure the DBRS 100 to remove a backup volume from the media database 120 after a specified period of time has elapsed since the backup was created. An administrator can also define backup groups 112, 114, and 116, which could include one or more clients and their files, directories, or file systems, or all the files on a client machine.

When accessing clients 104, 105, 106, 107, and 108, the administrator can work within an administrator GUI (not shown). The administrator GUI can be displayed on any DBRS 100 machine, allowing an administrator to interface with, and broker services for, any client 104, 105, 106, 107, or 108, regardless of the client platform. Another important aspect of the capabilities of an administrator involves the ability to specify the application environment. For example, an administrator can create records that specify instructions such as backup devices the DBRS 100 will use and the number of clients defined. An administrator can also specify rules that the application will enforce within the backup and recovery environment, including backup scheduling and how long data will be protected before it is recycled.

In addition to administrator capabilities, the DBRS 100 also incorporates a system for recovery of lost data. When client data is lost or corrupted, users or an administrator can browse the recoverable files in file index 118 and then create a report to describe the status of the lost data or the location, tracked by media database 120 of the contents in the volumes on backup devices 126, 128, 130 and 132. The user can then recover the lost data to a user specified point in time. When a request is made to recover lost data, the DBRS 100 locates the data sought and directs recovery of the file(s). Data can be recovered to the client 104, 105, 106, 107, or 108 where the data originated, or to another specified client.

Furthermore, DBRS 100 has the ability to perform in heterogeneous environments and can run on a variety of different platforms. For example, backup software on a UNIX server can support Windows clients or vice-versa. Backup data for any device or volume related to a client can be read and the data of the device or volume can be recreated to a user-specified point in time by any DBRS 100 server, regardless of the server platform. Backup data from any system client 104, 105, 106, 107, or 108 can coexist in a single backup device or on a single media set, regardless of the platform of client 104, 105, 106, 107, or 108.

II. Systems and Methods for Dynamic Backup

A. Components of an Exemplary Mirroring System

The exemplary DBRS 100 outlined above intelligently stores and retrieves files on a network. In addition to the capabilities of the exemplary system discussed above, the exemplary system can support a variety of additional applications and features. One such application incorporates database backup features that account for database mirroring.

Figure 2:
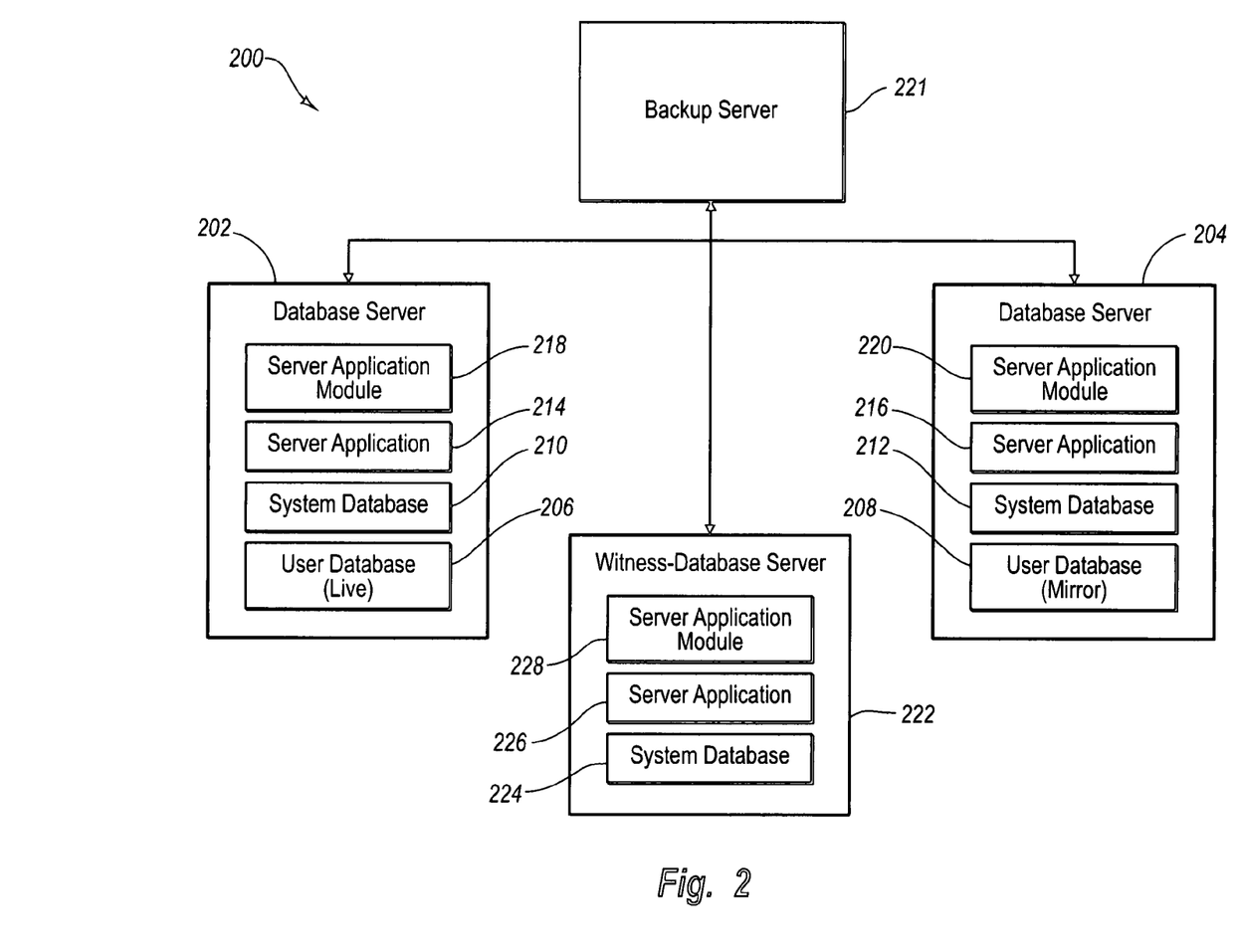
FIG. 2 illustrates an exemplary system for locating databases in a database mirroring environment.

An exemplary database mirroring system 200 is shown in FIG. 2. Database mirroring system 200 includes a database server 202 and a database server 204. One of database server 202 and database server 204 is designated as the primary server, while the other is designated as the secondary server. When database server 202 is designated as the primary server, user database 206 located on server 202 is the live database. Similarly, with database server 204 designated as the secondary server, user database 208 is the mirror database.

In addition to user databases 206 and 208, database server 202 and database server 204 include, respectively, system databases 210 and 212. System databases 210 and 212 contain information which is used to establish the roles of user databases 206 and 208 as either "live" or "mirror." When the user databases 206 and 208 are configured to participate in database mirroring, server applications 214 and 216 update the system databases 210 and 212 installed on database server 202 and database server 204, respectively, to contain information concerning the status of user databases 206 and 208 as either "live" or "mirror." Subsequent to this initial setup, all information contained on system databases 210 and 212 concerning the status of user databases 206 and 208 as either "live" or "mirror" is maintained by server applications 214 and 216. Each of server applications 214 and 216 monitors the status of user database 206 as well as user database 208 and records the status of each of user database 206 and user database 208 in the system database associated with the server application. For example, when the status of user database 206 changes from "live" to "mirror," the change in status of user database 206 is monitored by server application 214 and recorded in system database 210. The simultaneous change in status of user database 208 from "mirror" to "live" is also monitored by server application 214 and recorded in system database 210. Likewise, when the status of user database 208 changes from "mirror" to "live," the change in status of user database 208 is monitored by server application 216 and recorded in system database 212. The simultaneous change of status of user database 206 from "live" to "mirror" is also monitored by server application 216 and recorded in system database 212.

While server applications 214 and 216 monitor the status changes of user databases 206 and 208, server application modules 218 and 220 manage the status information of user databases 206 and 208 within database mirroring system 200. A module, such as server application modules 218 and 220, is a piece of code capable of performing a function, such as backup and/or restore of user databases. For example, the function performed by a module could be a backup and/or restore of Microsoft SQL Server databases, in which case user databases 206 and 208 are Microsoft SQL Server databases, and server applications 214 and 216 are Microsoft SQL Server applications. Although the present invention may be used in conjunction with Microsoft SQL Servers, the scope of the invention is not limited to use with Microsoft SQL Servers.

Each of server applications 214 and 216 is associated with a specific server application module. Server application module 218 is associated with server application 214 and server application module 220 is associated with server application 216. On database server 202, server application module 218 queries the status information in system database 210 to find out whether user database 206 is the live user database or the mirror user database. Likewise, on database server 204 server application module 220 queries the status information in system database 212 to find out whether user database 208 is the live user database or the mirror user database. Prior to backup of the live user database in database mirroring system 200, one of server application modules 218 and 220 identifies the current live user database. Identification of the live user database in conjunction with a user database backup operation is discussed in more detail with reference to FIG. 4, below.

Not only do server application modules 218 and 220 identify the live user database during a backup operation, server application modules 218 and 220 also communicate with each other to coordinate and manage mirror relationships during backup and restore operations. When server application module 218 or 220 is invoked by backup server 221, which corresponds to backup server 102 shown in FIG. 1, server application module 218 or 220 is able to detect a change in the designation of user databases 206 and 208. Once the change in the designation of user databases 206 and 208 is detected, server application modules 218 and 220 communicate with each other concerning the change in the designation of the user databases 206 and 208. After server application modules 218 and 220 communicate with each other, server application module 218 or 220 communicates the change in the designation of the user databases 206 and 208 to backup server 221. Backup server 221 is then able to update the information concerning the designations of user databases 206 and 208 in the saveset for the database server to be backed up and invoke the server application module 218 or 220 corresponding to the live database to complete the backup.

As an example of how server application modules 218 and 220 communicate with each other and subsequently with backup server 102 to complete backup and restore operations, assume a failover occurs causing the status of user database 206 to change from "live" to "mirror." When the server application module 218 is invoked after failover has occurred, server application module 218 communicates with server application module 220 concerning the status of user database 206. Server application module 218 learns from server application module 220 that user database 208 is now the live database. Server application module 218 also informs server application module 220 that user database 206 is currently the mirror database. After communicating with server application module 220, server application module 218 communicates with backup server 221 to notify backup server 221 of the change in status of user database 206 and user database 208. Backup server 221 then records the modified status information as saveset information for the database server to be backed up in database mirroring system 200. This process is called probing and is used to locate the live database.

The functions performed by server application modules 218 and 220, within database servers 202 and 204, respectively, are an integral part of backup operations within database mirroring system 200. Before a backup operation can take place within database mirroring system 200, the location of the live database must first be ascertained. When a backup operation is initiated, either of server application 214 located on database server 202 and server application 216 located on database server 204 may be contacted to locate the live user database. The backup operation can be initiated by a user or by backup server 221. Backup sever 221 contacts server application module 218 or 220 which may in turn contact server application 214 or 216 to know the status of user databases 206 and 208. The server application module 218 or 220 corresponding to the live user database 206 or 208 performs the backup operation. The status of user databases 206 and 208 is determined by reading information from system databases 210 and 212. For example, if backup server 221 contacts server application module 218, server application module 218 performs the function of reading table entries in system database 210 by contacting server application 214. Likewise, if server application module 220 is contacted by backup server 221, server application module 220 performs the function of reading table entries in system database 212 by contacting server application 216. The table entries contained in system databases 210 and 212 contain information regarding the status of user databases 206 and 208. Each system database 210 and 212 contains information regarding the status of each user database 206 and 208 in database mirroring system 200. For example, system database 210 may contain information about the status of user database 206 as "live" and also contain information about the status of user database 208 as "mirror." The information contained in system databases 210 and 212 concerning each of user databases 206 and 208 allows the backup server to obtain information concerning the location of the live database by contacting only one of server application modules 218 and 220 located on database servers 202 and 204.

As an example of the functions performed in database mirroring system 200 during a backup operation, assume that user database 206 is currently the live user database and user database 208 is currently the mirror database. When a backup is initiated, backup server 221 contacts server application module 220 located on database server 204. Server application module 220 then performs the function of reading the table entries contained in system database 212 by contacting server application 216. The table entries in system database 212 indicate that user database 208 is the mirror database and that user database 206 is the live database. Server application module 220 returns this information to backup server 221. Backup server 221 then backs up user database 206, since user database 206 is currently the live database.

With reference now to FIG. 1, when the live user database is backed up, the name of the database server where the live user database resides is recorded in file index 118 located on backup server 102. The entry made in the file index 118 for the live user database is a live entry. The name of the database server where the mirror database resides is also recorded in the file index 118. The entry made in the file index 118 for the mirror user database is referred to as an alias entry. By recording the status of each user database at the time of a specific backup, entries in the file index 118 make it possible to reconstruct a chain of backups and provide a way to easily identify the location of the live user database in the event restoration of the live user database is requested.

Returning attention now to FIG. 2, it was noted above that in order to make it possible for backup server 221 to backup the live user database, the status of user databases 206 and 208 is tracked within database mirroring system 200. While database servers 202 and 204 include, respectively, system databases 210 and 212 which track the status of user databases 206 and 208, witness 222 may also be incorporated into the database mirroring system 200 to track the status of user databases 206 and 208. For example, when user database 206 changes status from "live" database to "mirror" database, witness 222 tracks the change by recording the current status of user database 206 in system database 224. Similarly, when user database 208 changes status from "mirror" database to "live" database, witness 222 also tracks the change in status of user database 208 in system database 224. In this way, system database 224 performs functions similar to those performed by system databases 210 and 212 located, respectively, on database servers 202 and 204.

An additional similarity between witness 222 and database servers 202 and 204 is that, like database servers 202 and 204, witness 222 includes a server application 226 and a server application module 228. Server application 226 performs functions equivalent to the functions performed by server applications 214 and 216. Namely, server application 226 is updated by server applications 214 and 216 regarding the status of user databases 206 and 208 and maintains a record of this information in system database 224. Server application module 228, like server application modules 218 and 220, communicates with server application modules 218 and 220 to learn the status information of user databases 206 and 208 and server application module 228 may also retrieve the status information from system database 224 by contacting server application 226.

Witness 222 may perform other functions in addition to tracking the status changes in user databases 206 and 208. For example, witness 222 participates in assigning roles in database mirroring system 200. Specifically, witness 222 may participate in assigning the role of live database to user database 206 and in assigning the role of mirror database to user database 208. The role assignment is based on a majority consensus between database servers 202 and 204, and witness 222. More particularly, witness 222 may arbitrate changes in the respective roles of user database 206 and user database 208. Witness 222 may drive automatic failover within database mirroring system 200 and the accompanying change in the status of user databases 206 and 208. For example, if a failover occurs when user database 206 is the live database, witness 222 immediately assigns the role of live database to user database 208 and changes the role of user database 206 to mirror database. By arbitrating the change in the roles of user databases 206 and 208, witness 222 ensures that no data is lost when a failover occurs. Without the presence of witness 222 in database mirroring system 200, a user may opt to drive the failover and assign user database 208 the role of live database and user database 206 the role of mirror database.

Figure 3:
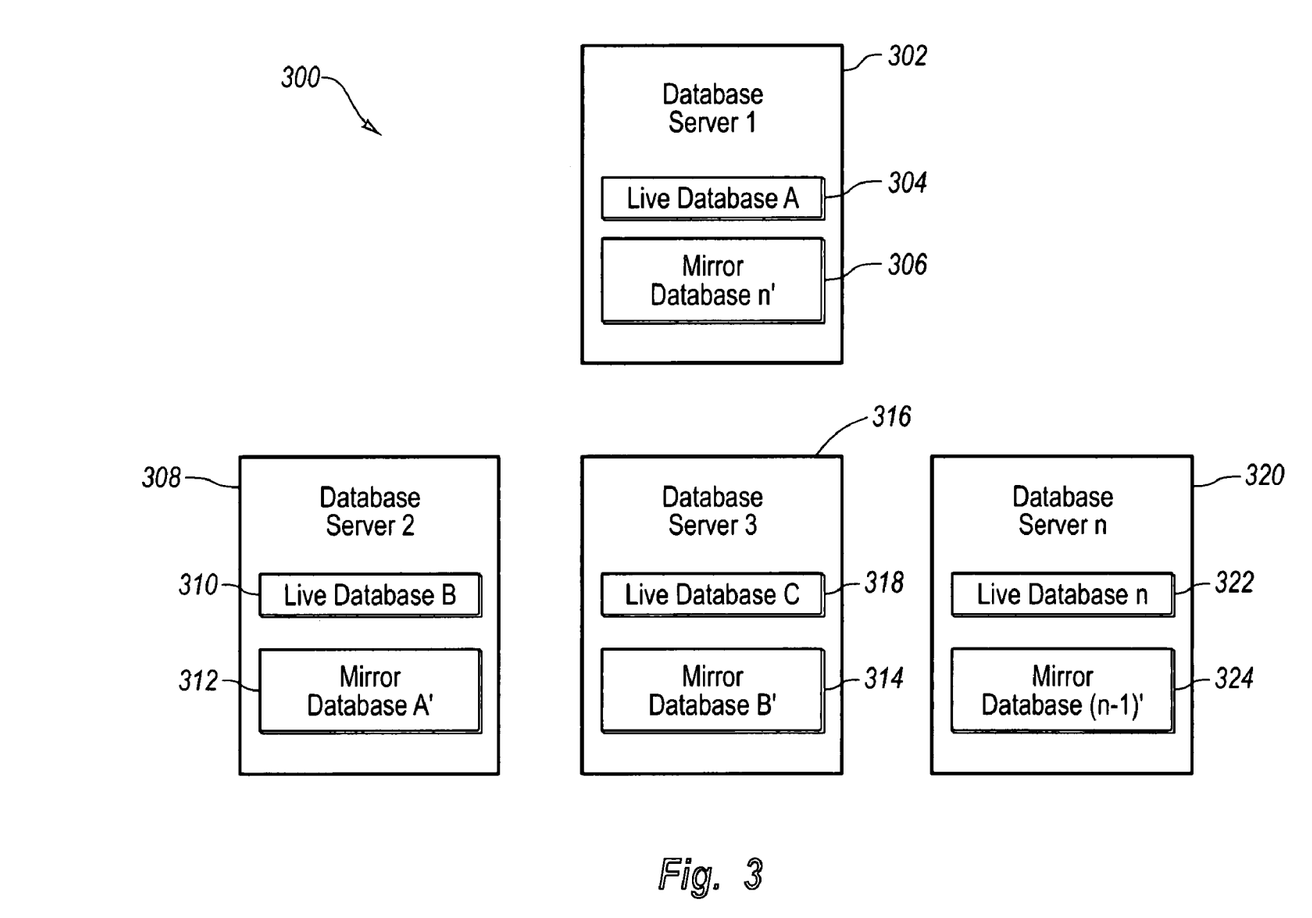
FIG. 3 illustrates an exemplary system for configuring a mirroring relationship for any number of databases in a database mirroring environment.

Although a database mirroring system, as shown in FIG. 2, may include only primary server 202, secondary server 204, and witness 222, numerous other configurations of mirroring databases are possible. As shown in FIG. 3, there is no restriction on how many different databases may be mirrored, nor is there any restriction on the relationships between database servers hosting mirror databases. For example, a first database server 302 may host live database "A" 304 as well as mirror database n' 306. Second database server 308 may host live database "B" 310 and mirror database A' 312. In this example, mirror database A' 312 residing on second database server 308 is associated with live database A 304 residing on first database server 302. The mirror database B' 314 associated with live database B 310, however, does not reside on first database server 302 but instead resides on third database server 316. In addition to hosting mirror database B' 314, third database server 316 hosts live database C 318. Finally, nth database server 320 hosts live database n 322 and mirror database (n−1)' 324. FIG. 3 illustrates an exemplary embodiment of a configuration of live and mirror databases on multiple database servers. In addition any database server 302, 308 316 or 320 might serve as a witness for any database. However, any number of different configurations of live and mirror databases on any number of database servers is possible and contemplated by embodiments of the present invention. The scope of the invention is not limited for use in connection with any particular arrangement of live and mirror databases residing on specific servers.

B. Mirroring Functionality

Directing attention again to FIG. 2, modules 218, 220 and 228 and user databases 206 and 208 are exemplary components of a database mirroring system 200. Modules 218, 220, and 228, and user databases 206 and 208 are configured to cooperate in a way that allows data to be backed up from databases 206 and 208 in a database mirroring system 200.

As noted earlier, an exemplary database mirroring system 200 includes at least two database servers 202 and 204, a live user database 206 and a mirror user database 208. In a network that includes two or more database servers 202 and 204, each of the user database 206 and the user database 208 may be assigned the role of live user database or mirror user database. Although the live user database 206 and mirror user database 208 are initially designated as "live" or "mirror," the designation of a specific database can change at any time. Thus, the roles of "live" and "mirror" are dynamically reassigned. For example, the user database 206 which resides on database server 202 may initially be designated as the live user database. With the user database 206 residing on database server 202 designated as the live user database, the user database 208 residing on database server 204 will be designated as the mirror user database. Later, the roles of the respective user databases 206 and 208 may change, so that the designation of user database 206 will change from "live" to "mirror" and the designation of user database 208 will change from "mirror" to "live." The roles of the respective user databases 206 and 208 may change for any number of reasons, such as failure of the database server 202 on which the live user database 206 resides, a scheduled change in the roles of the respective user databases, or arbitration by an additional database server such as witness 222, or other system device, in the network.

Not only do the roles of live or mirror user databases 206 and 208 dynamically change within the database mirroring system 200 over time, the roles are also not arbitrary but instead refer to specific functions performed by the respective user databases 206 and 208. In particular, the database mirroring system 200 designates the live user database 206 as "live" because the live database 206 is the database actively working in the system. In the event of a backup operation, the live user database 206 is the database which is backed up within database mirroring system 200. At the same time, the mirror user database 208 is inactive and not directly involved in backup operations so long as it functions as the mirror user database.

Although the mirror user database 208 is not directly involved in backup operations, the database mirroring system 200 may require the mirror user database 208 to switch roles at any time to become the live user database. For this reason, in synchronous mirroring the mirror user database 208 receives and stores information concerning database updates each time tables in the live user database are modified. That is, the mirror user database 208 "mirrors" the entries made in the live user database 206 in order to keep an up-to-date record of the live user database 206. In this way, in the event that the database mirroring system 200 requires mirror user database 208 to switch roles to the live user database, no user database information is lost or inaccessible because all information present in the live user database 206 is also present in the mirror user database 208.

The allocation of the roles of live user database and mirror user database is particularly important in terms of backup operations on the network. Backup operations can be initiated in a variety of ways. One possible method for backing up user databases is for an individual user on the system to initiate backups of a designated user database at any time the user may choose. Another possibility for backing up databases is for an administrator to define a schedule within the system according to which user databases in the system are automatically backed up. The administrator may designate all user databases in the system or only selected user databases in the system to be backed up during a backup operation. Backup operations in a database mirroring environment are discussed in further detail in Section D, infra.

As an exemplary standard for performing database mirroring processes such as those disclosed herein, the Microsoft SQL Server 2005 (codename Yukon) standard is hereby incorporated by reference in this application. In an exemplary embodiment, the present invention can be employed in conjunction with Microsoft SQL Server 2005 (Yukon) databases. However, other uses and applications may also be suitable or desirable in relation to the present invention and the scope of the invention is not limited to use in conjunction with Microsoft SQL Server 2005 (Yukon).

C. Performing a Probing Process in a Mirroring Environment

An exemplary database mirroring backup system incorporates applications and modules that perform important functions in the database mirroring system 200. The functions performed by modules 218, 220, and 228 are part of the database mirroring system 200 functionality. When a backup of one or more user databases in database mirroring system 200 is initiated, a probing process takes place to locate the live user database within database mirroring system 200. The probing process includes specific functions performed by modules 218, 220, and 228 in relation to system databases 210 and 212. The purpose of the probing process is to determine the location of the live user database so that the live user database in the system can be backed up during a backup operation.

Figure 4:
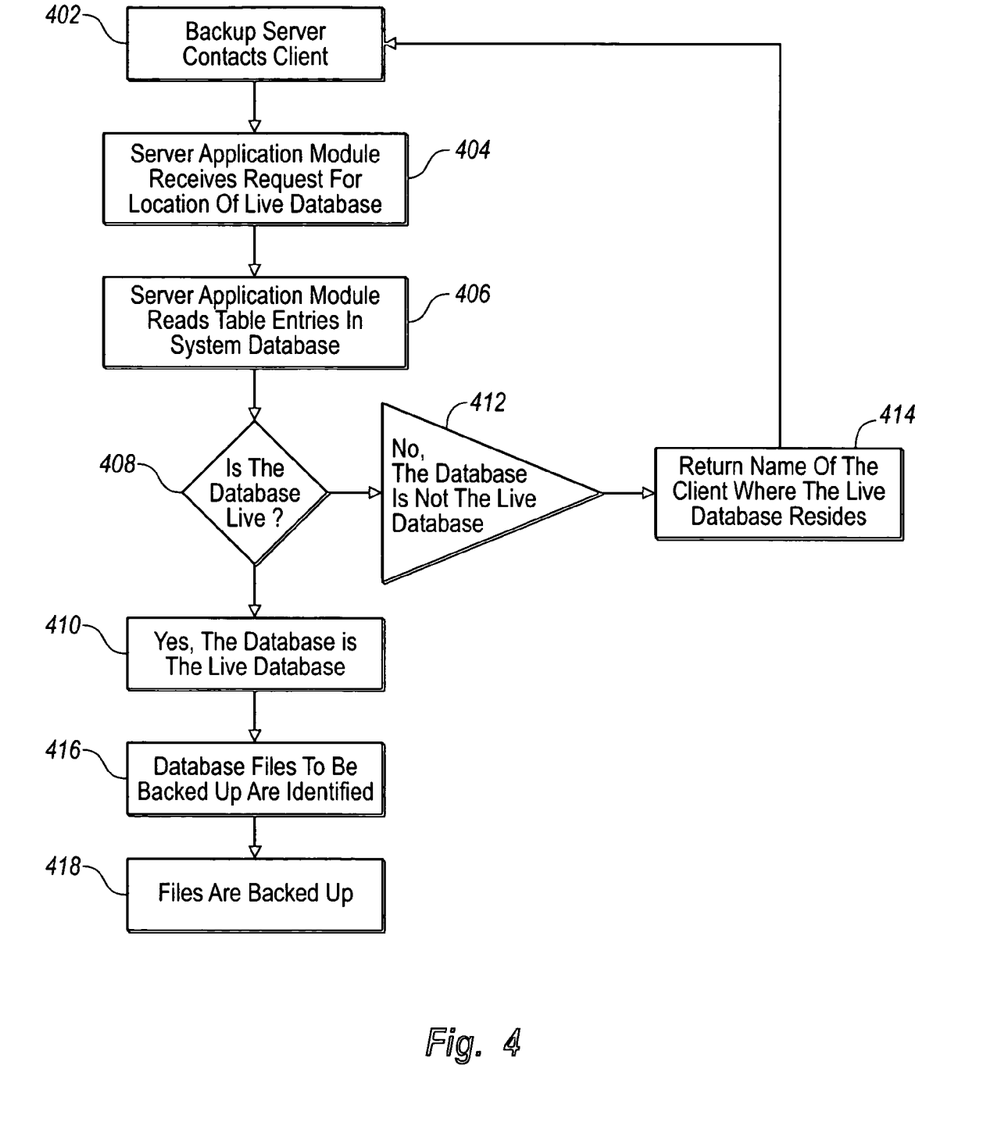
FIG. 4 illustrates an exemplary process for determining the live database and backing up databases in a database mirroring environment.

Aspects of an exemplary probing process 400 which takes place when a backup of the live user database is initiated are disclosed in FIG. 4. As noted above, the probing process 400 is the process by which the live user database is located in database mirroring system 200. The probing process 400 begins when the backup server contacts a client, also referred to as a database server, as shown at stage 402 and makes a request as to the status of a database located on the client to which the request is directed. Contact between the backup server and the client can be initiated by a client request to backup the live database, in accordance with a system schedule specifying when backups of live databases are performed, or in various other ways. After the backup server contacts the named client, the server application module located on the client receives the request for information concerning the location of the live database, as shown at stage 404. The server application module then contacts the system database located on the database server of the queried client to determine the location of the live user database.

The determination of the location of the live database is made when the server application module reads table entries contained in the system database located on the client, as shown at stage 406. The table entries contain information concerning the status of the databases within the database mirroring system. At stage 408, the server application module queries the table entries to determine if the database located on the queried client is the live database. If the table entry specifies that the live database is located on the queried client, as shown at stage 410, the live database is located and the backup can proceed.

However, if the table entry specifies another database located on a different client as the live database, the server application module recognizes that the database on the queried client is not the live database, as shown in stage 412. The server application module then returns the name of the client, where the live database resides, to the backup server, as shown at stage 414. The probing process 400 is then re-initiated at stage 402 as the backup server contacts the client hosting the live database and named by the server application module in stage 414. At this point in the probing process 400, the client hosting the live database has been identified and, therefore, processing of steps 402 through 408 proceeds smoothly and continues to stage 410. However, there is some chance that a failover may occur just as the client where the live database resides is identified and by the time the backup server contacts the live client, the live client has become the mirror client. This would result in one more iteration through stages 402, 406, 408, 412, and 414. In most instances one or two iterations will prove sufficient for locating the live database and backing up the files. A third iteration is unlikely and would indicate two failovers within a very short period of time and major instabilities within the database servers.

Returning now to stage 410, if the system table entries specify that the queried client hosts the live database, the process continues at stage 416 where the database files to be backed up (i.e., "files of interest") are identified. Once the database files have been identified, the files are backed up and the probing process 400 is completed, as shown at stage 418. Details concerning this backup operation are provided below in connection with the discussion of FIG. 5.

D. Database Backup Operations in a Mirroring Environment

Figure 5:
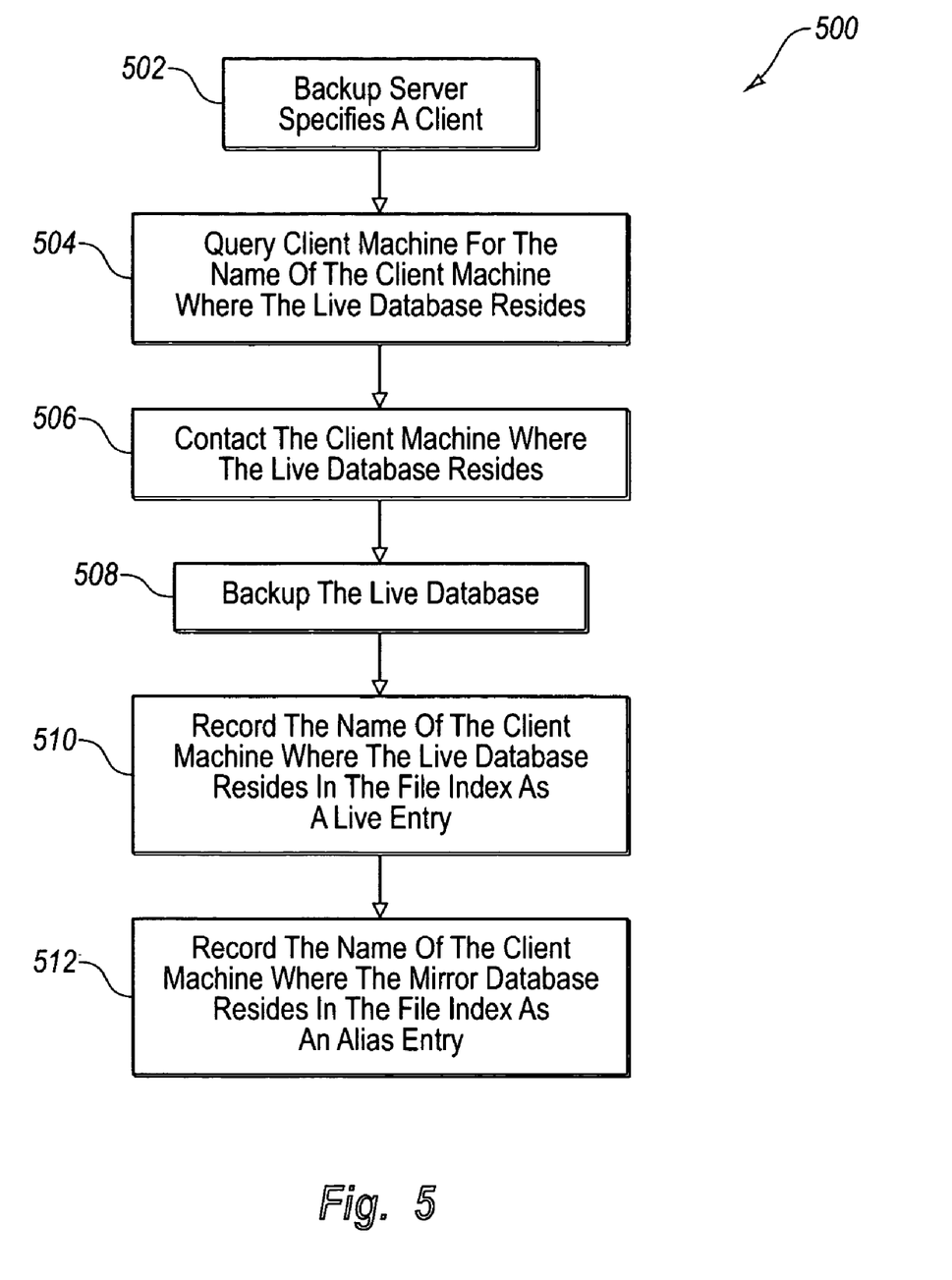
FIG. 5 illustrates an exemplary process for backing up databases in a database mirroring environment.

The backup process 500 shows an exemplary process for backing up databases notwithstanding the dynamically changing roles of those databases in a database mirroring environment. When a database is initially backed up, an entry for the database is made in the file index of the backup server in the database mirroring system. The entry in the file index contains information concerning the database, including the status of the database as "live" or "mirror." Each time a backup of the database in the database mirroring environment is performed, an additional entry is added to the file index for that database. Information contained in the backup entry made at the time of backup is similar to the information contained in the initial entry concerning the status of the database. For example, an entry made at the time of a backup may contain information such as the date the backup was performed, the time the backup was performed, and the status of the database at the time the backup was performed.

In addition to containing information concerning the status of the database when a backup was performed, an entry in the file index for a database also contains a cross reference to a mirror database in the system. More particularly, since the database is the live database at the time of backup, the entry for the database in the file index cross references the database server which contained the mirror database at the time of backup. The cross referencing of the client machines of the live and mirror databases in the file index makes it possible to trace the status of the databases over a period of time when many backups were performed and makes it possible to determine that the live and mirror databases are actually the same database. A search of one entry for a single database will give information concerning the identity of other client machines in the system.

In order for databases within the database mirroring system to be backed up, the databases to be backed up must first be identified. The backup server specifies a unique client through which to begin the backup process. This is shown in stage 502 of FIG. 5. A system administrator may determine that all databases in the system will be backed up during a specific backup operation, or an administrator may determine that only selected databases will be backed up during a backup operation. Another possibility is that a system user may designate certain databases the user wishes to include in a backup operation. Alternatively, the backup system may be configured to automatically back up all or a portion of the specified databases according to a specific schedule.

Whether the databases to be backed up are designated by an administrator or a user, or in some other fashion, the backup server contacts the specified client machine and initiates the probing process (see FIG. 4) during which the backup server queries the specified client machine for the name of the client machine where the live database resides, as shown at stage 504. The client machine where the live database resides is then contacted, as shown at stage 506. After the backup server has contacted the client machine where the live database resides, the live database is backed up, as shown in stage 508. The name of the client machine where the live database resides is then recorded in the file index of the backup server as a live entry, as shown at stage 510. The name of the client machine where the mirror database resides is also recorded in the file index, but as an alias entry, as shown at stage 512. The alias entry includes a cross reference to the entry made for the live database.

As an example of user accessibility to backups which may occur within a database mirroring system, a first set of backups may occur while the database is hosted on database server A. The database hosted on database server A is the live database. If, after the first set of backups has been performed, a failover occurs, such as a database server A crash and the role of live database automatically switches to the database hosted on database server B, the next set of backups will be performed while the database is hosted on database server B, or, in other words, while database server B is the live database. Although the backups have been performed both while database server A was the live database and while database server B was the live database, the chain of backups can be reconstructed using the cross referencing of the databases in the entries contained in the file index of the backup server.

The data that is backed up in the manner disclosed herein can be used for any of a variety of purposes. For example, the backed-up data can be used to restore an original database in the event of system failure or some other event that results in the loss of the original data. For example, in the event of the loss of data at user databases 206 and 208 of FIG. 1, the backed-up copy of the data can be used to restore the user databases 206 and 208. Examples of methods for restoring data that has been lost, using backed-up data generated according to the methods disclosed herein, are described in U.S. patent application Ser. No. 11/080,047, entitled "Systems and Methods for Restoring Data", which has been filed on the same day as the present patent application and is incorporated herein by reference.

Embodiments of the invention include a computer program product for implementing a method for backing up a database in a network that includes a live database and a mirror database, and client machines. The computer product may comprise a computer readable medium carrying computer executable instructions for performing the method. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a database mirroring network that includes a backup server, a live database and a mirror database, as well as client machines, a method for backing up a database comprising:
sending a request to one of the client machines for obtaining status information of a database associated with the client machine to which the request is directed;
receiving, from the client machine, the status information that identifies a location of the live database, wherein the live database actively participates in database mirroring to the mirror database, the live database being configured to have its designation dynamically changed to the mirror database and the mirror database being configured to have its designation dynamically changed to the live database;
backing up the live database using the status information that identifies the location of the live database, notwithstanding any ongoing changes in the designation of the live database; and
continuing to coordinate a mirror relationship between the live database and the mirror database while backing up the live databases to a backup, wherein that data in the mirror database is an up-to-date record of the live database and the backup includes data of the live database at a time of the backup.

2. The method as recited in claim 1, wherein the status information that identifies a location of the live database is located on a system database of the client machine to which the request is directed.

3. The method as recited in claim 1, wherein if the status information of the associated database specifies that the associated database is a mirror database, information in a system database also identifies the client machine hosting the live database.

4. The method as recited in claim 1, wherein sending the request to one of the client machines is performed according to a schedule specifying a time for automatically backing up the live database.

5. The method as recited in claim 1, wherein sending the request to one of the client machines is performed in response to user initiation of a backup of the live database.

6. The method as recited in claim 1, further comprising:
identifying a file of interest in the live database such that backing up the live database comprises backing up the file of interest.

7. The method as recited in claim 1, wherein backing up the live database further comprises:
making an entry concerning the location of the live database at the time of backup in a file index located on a backup server; and
making an alias entry concerning the location of a mirror database at the time of backup in a file index located on a backup server.

8. The method as recited in claim 7, further comprising:
receiving a storage location of a file of interest in the live database; and
recording the storage location of the file of interest in the mirror database.

9. The method as recited in claim 8, wherein recording the storage location of the file of interest in the live database includes making a table entry in system databases located on the client machines.

10. The method as recited in claim 8, wherein recording the storage location of the file of interest in the mirror database includes making a table entry in system databases located on the client machines.

11. In a database mirroring network that includes a first database server, a second database server, and a backup server, a method for locating a database to be backed up, the method comprising:
receiving a database status request from the backup server to back up a live database, wherein the live database participates with database mirroring to a mirror database, the live database being configured to have its designation dynamically changed to the mirror database and the mirror database being configured to have its designation dynamically changed to the live database;
responding to the database status request by locating a table entry concerning a database associated with one of the first database server or the second database server;
identifying status information of the associated database using the table entry;
transmitting, to the backup server, the status information concerning the associated database, wherein the status information specifies at least whether the database is one of the live database or the mirror database, the method being performed notwithstanding any ongoing changes in the designations of the live and mirror databases and while continuing with database mirroring between the live database and the mirror database; and
making an entry concerning the location of the live database and of the mirror database at the time of backup in a file index.

12. The method as recited in claim 11, wherein the database status request is received according to a schedule specifying a time for automatically backing up the live database.

13. The method as recited in claim 11, wherein the database status request is received in response to a user initiated backup of the live database.

14. The method as recited in claim 11, wherein if the status information of the associated database specifies that the associated database is a mirror database, the status information also identifies the database server hosting the live database.

15. The method as recited in claim 11, wherein if the status information of the associated database specifies that the associated database is a live database, the database server referenced in the table entry hosts the live database.

16. The method as recited in claim 11, wherein the table entry is located in a system database associated with one of the first database server or the second database server.

17. A computer program product for implementing a method for backing up a database in a network that includes a backup server, a live database and a mirror database, and client machines, the computer program product comprising:
a computer readable medium having computer executable instructions encoded thereon that, when executed, perform a method, wherein the method comprises:
sending a request to one of the client machines for obtaining status information of a database associated with the client machine to which the request is directed;
receiving, from the client machine, the status information that identifies a location of the live database; and
backing up the live database using the status information that identifies the location of the live database, notwithstanding any ongoing changes in the designation of the live database, wherein backing up the live database includes:
- making an entry concerning the location of the live database at the time of backup in a file index located on a backup server; and
- making an alias entry concerning the location of a mirror database at the time of backup in the file index located on the backup server, the live database being configured to have its designation dynamically changed to the mirror database and the mirror database being configured to have its designation dynamically changed to the live database.

18. The computer program product as recited in claim 17, wherein if the status information specifies that the database is the live database, a client machine referenced in the table entry identifies the client machine hosting the live database.

19. The computer program product as recited in claim 17, wherein if the status information of the associated database specifies that the associated database is a mirror database, the status information also identifies the client machine hosting the live database.

20. The computer program product as recited in claim 17, wherein sending the request to one of the client machines is performed according to a schedule specifying a time for automatically backing up the live database.

21. The computer program product as recited in claim 17, wherein sending the request to one of the client machines is performed in response to user initiation of a backup of the live database.

22. The computer program product as recited in claim 17, wherein the table entry is located in a system database.

23. The computer program product as recited in claim 17, further comprising:
- identifying a file of interest in the live database such that backing up the live database comprises backing up the file of interest.

24. The computer program product as recited in claim 17, further comprising:
- receiving a storage location of the file of interest in the live database; and
- recording the storage location of the file of interest in the mirror database.

25. The computer program product as recited in claim 24, wherein recording the storage location of the file of interest in the live database includes making a table entry in system databases located on the client machines.

26. The computer program product as recited in claim 24, wherein recording the storage location of the file of interest in the mirror database includes making a table entry in system databases located on the client machines.

* * * * *